United States Patent
Neyraval et al.

(10) Patent No.: US 9,447,250 B2
(45) Date of Patent: Sep. 20, 2016

(54) METHOD FOR REMOVING RESIDUAL TITANIUM FROM A POLYESTER SOLUTION

(75) Inventors: Philippe Neyraval, Shanghai (CN); Natalie Soto, Rockville, MD (US); Daobing Lin, Shanghai (CN); MingJuan Wang, Shanghai (CN)

(73) Assignee: Rhodia Operations, Aubervilliers (FR)

( * ) Notice: Subject to any disclaimer, the term of this patent is extended or adjusted under 35 U.S.C. 154(b) by 112 days.

(21) Appl. No.: 14/377,932

(22) PCT Filed: Feb. 13, 2012

(86) PCT No.: PCT/CN2012/071065
§ 371 (c)(1),
(2), (4) Date: Dec. 3, 2014

(87) PCT Pub. No.: WO2013/120244
PCT Pub. Date: Aug. 22, 2013

(65) Prior Publication Data
US 2015/0080496 A1    Mar. 19, 2015

(51) Int. Cl.
*C08G 63/90* (2006.01)
*C08J 11/00* (2006.01)
*C08G 63/85* (2006.01)

(52) U.S. Cl.
CPC ............... *C08J 11/00* (2013.01); *C08G 63/85* (2013.01); *C08G 63/90* (2013.01); *C08J 2367/02* (2013.01)

(58) Field of Classification Search
CPC ......... C08G 63/85; C08G 63/90; C08J 11/00
USPC ......................................... 523/332; 524/605
See application file for complete search history.

(56) References Cited

FOREIGN PATENT DOCUMENTS

JP    2007161972    *    6/2007

* cited by examiner

*Primary Examiner* — Edward Cain
(74) *Attorney, Agent, or Firm* — Osha Liang LLP

(57) ABSTRACT

The present invention provides a method for reducing level of titanium in an aqueous solution of polyester in a safe and effective way, while avoiding hydrolysis of the polyester.

19 Claims, 2 Drawing Sheets

METHOD FOR REMOVING RESIDUAL TITANIUM FROM A POLYESTER SOLUTION

CROSS-REFERENCE TO REALTED APPLICATIONS

The present application is a U.S. national stage entry under 35 U.S.C. §371 of International Application No. PCT/CN2012/071065 filed Feb. 13, 2012, the whole content of this application being herein incorporated by reference for all purposes.

FIELD OF THE INVENTION

The present invention relates generally to a novel method for reducing level of titanium in an aqueous solution of polyester, while avoiding hydrolysis of the polyester. Particularly, the novel method is provided to remove residual titanium from an aqueous solution of soil release polymers.

BACKGROUND OF THE INVENTION

Polyesters are widely used in a variety of industries. For polyester synthesis, a titanium-based catalyst is commonly used, which shows a superior catalytic activity over other metal and non-metal catalysts.

Among a variety of polyester applications, some commercial products composed of polyester are made or used in an aqueous solution. An example of aqueous application is a polyether-polyester block copolymer which has been used in fabric mill treatment and in both powder and liquid detergent as soil release polymer (SRP). For example, polyethylene terephthalate/polyoxyethylene terephthalate (PET/POET) and its variants are used as soil release agents in liquid detergent compositions. These copolymers are described in U.S. Pat. Nos. 3,416,952, 4,349,688, 4,702,857, 4,877,896, 4,738,787, and 5,786,318 etc. When a polyester product is dissolved in water, trace of titanium residue left from the reaction will precipitate out of the solution, especially after several months when firstly dissolved. This will deteriorate the product quality and thus is not desired for a commercial product, especially for those long-term storage liquid reagents.

Although there are many literatures for titanium-catalyzed polyester synthesis, there are a very limited number of literatures for removing the residual titanium, especially for removing the residual titanium from aqueous product.

Chinese patent CN1283614C discloses a process for removing titanate catalyst from an esterification product, in which titanate catalyst was treated with sodium percarbonate, a mixture of sodium carbonate and an aqueous solution of hydrogen peroxide, or a mixture of sodium bicarbonate and an aqueous solution of hydrogen peroxide to form a flocculent precipitate, followed by filtering the resultant precipitate to remove the titanate catalyst. During the reaction, an alkali condition was utilized.

PCT International Publication No. WO 2001019775 discloses a process for removing titanium oxide from a polyester decomposition product, in which the titanium oxide was reacted with calcium oxide, calcium carbonate or calcium hydroxide to form titanium dioxide, and the formed titanium dioxide was aggregate and filtered. During the reaction, an alkali condition was also applied.

However, the methods described in above patent/patent application fail to teach that the titanium residue can be reduced to a satisfactory level, for example, of less than 5 ppm. In addition, there is a risk of hydrolysis for polyester when exposing the polyester product in a strict alkaline reaction condition.

Furthermore, filtering the titanium residue from aqueous solution is labor-consuming and time-consuming. All above references fail to teach the inorganic form of titanium can be effectively removed by filtration within an acceptable period of time, for example, within 4 hours.

As a result, a safe and effective method of reducing level of titanium in an aqueous solution of polyester is needed to be explored.

SUMMARY OF THE INVENTION

The objective of the present invention is to provide a method for reducing level of titanium in an aqueous solution of polyester in a safe and effective way, while avoiding hydrolysis of the polyester.

The present invention provides:
1. A method for removing residual organic titanium from an aqueous solution of a polyester comprising residual organic titanium, comprising steps of:
   (a) adjusting pH of the aqueous solution to a value from about 4.0 to about 5.0 by adding phosphoric acid or an acidic salt thereof;
   (b) treating the aqueous solution obtained in step (a) with an oxidant that is hydrogen peroxide or peroxyacetic acid to result in a titanium-containing solid; and
   (c) removing the titanium-containing solid from the reaction mixture obtained in step (b).
2. The method according to item 1, further comprising the step between step (b) and step (c): adjusting the pH of the aqueous solution obtained in step (b) to a value from about 6.0 to about 7.0 with an alkali.
3. The method according to any one of the preceding items, wherein alkali used is in the form of an alkaline solution.
4. The method according to any one of the preceding items, wherein alkali used in the form of an alkaline solution having a pH value from about 8.0 to about 11.0.
5. The method according to any one of the preceding items, wherein the pH of the aqueous solution is adjust to a value of about 4.0 in step (a).
6. The method according to any one of the preceding items, wherein the oxidant is used in an amount of from about 0.2% to about 5.0% by weight, preferably from about 0.5% to about 2.0% by weight, relative to the weight of the polyester in the aqueous solution used in step (a).
7. The method according to any one of the preceding items, wherein the step (b) is carried out at a temperature from room temperature to about 80° C., preferably from about 50° C. to about 80° C.
8. The method according to any one of the preceding items, wherein the treating time of step (b) is from about 0.5 hour to about 4.0 hours, preferably 1.0 hour to about 3.0 hours.
9. The method according to any one of the preceding items, wherein the step (c) is carried out by filtration.
10. The method according to any one of the preceding items, wherein a filter aid is introduced into the aqueous solution in one or more steps of (a)-(c).

11. The method according to any one of the preceding items, wherein the filter aid is selected from the group consisting of H-20, BH-40, hyflosupercel, and a combination thereof.
12. The method according to any one of the preceding items, wherein the filtration in step (c) is carried out at a temperature from about 40° C. to about 90° C., preferably from about 60° C. to about 80° C., more preferably from 65° C. to about 75° C.
13. The method according to any one of the preceding items, wherein the filtration in step (c) is carried out under a pressure from about 1.0 atm to about 4.0 atm, and preferably from about 2.5 atm to about 3.0 atm.
14. The method according to any one of the preceding items, wherein the filtration time in step (c) is from about 1.0 hour to about 2.0 hours.
15. The method according to any one of the preceding items, wherein the polyester comprising residual organic titanium is obtained from the preparation of polyester in the presence of a titanium-based catalyst.
16. The method according to any one of the preceding items, wherein the aqueous solution used in step (a) is obtained by dissolving the polyester comprising residual organic titanium into water, and optionally filtering the solution.
17. The method according to any one of the preceding items, wherein the titanium-based catalyst is an organic titanate.
18. The method according to any one of the preceding items, wherein the organic titanate is tetraalkyl titanate.
19. The method according to any one of the preceding items, wherein tetraalkyl titanate is selected from the group consisting of tetraisopropyl titanate, tetrabutyl titanate and a combination thereof.
20. The method according to any one of the preceding items, wherein the polyester is a soil release polyester.
21. The method according to any one of the preceding items, wherein the polyester is a polyether-polyester block copolymer.
22. The method according to any one of the preceding items, wherein the concentration of the polyester in the aqueous solution used in step (a) is from about 10% to about 90% by weight, preferably about 70% by weight.
23. An aqueous solution of a polyester comprising residual organic titanium, wherein the concentration of the titanium in the solution is less than 1 ppm.
24. The aqueous solution of item 24, wherein the concentration of the polyester in the aqueous solution is from about 10% to about 90% by weight, preferably about 70% by weight.
25. The aqueous solution of item 23 or item 24, wherein the polyester comprising residual organic titanium is obtained from the preparation of polyester in the presence of a titanium-based catalyst.
26. The aqueous solution according to any one of items 23-25, wherein the titanium-based catalyst is an organic titanate.
27. The aqueous solution according to any one of items 23-26, wherein the organic titanate is tetraalkyl titanate.
28. The aqueous solution according to any one of items 23-27, wherein tetraalkyl titanate is selected from the group consisting of tetraisopropyl titanate, tetrabutyl titanate and a combination thereof.
29. The aqueous solution according to any one of items 23-28, wherein the polyester is a soil-release polyester.
30. The aqueous solution according to any one of items 23-29, wherein the polyester is a polyether-polyester block copolymer.

The aqueous solution of polyester obtained by removing residual titanium according to the method described in the present invention shows a titanium level of less than 5 ppm, preferably less than 1 ppm. Furthermore, no hydrolysis of polyester is observed during the process of titanium removal.

BRIEF DESCRIPTION OF THE FIGURES

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Figure 1:
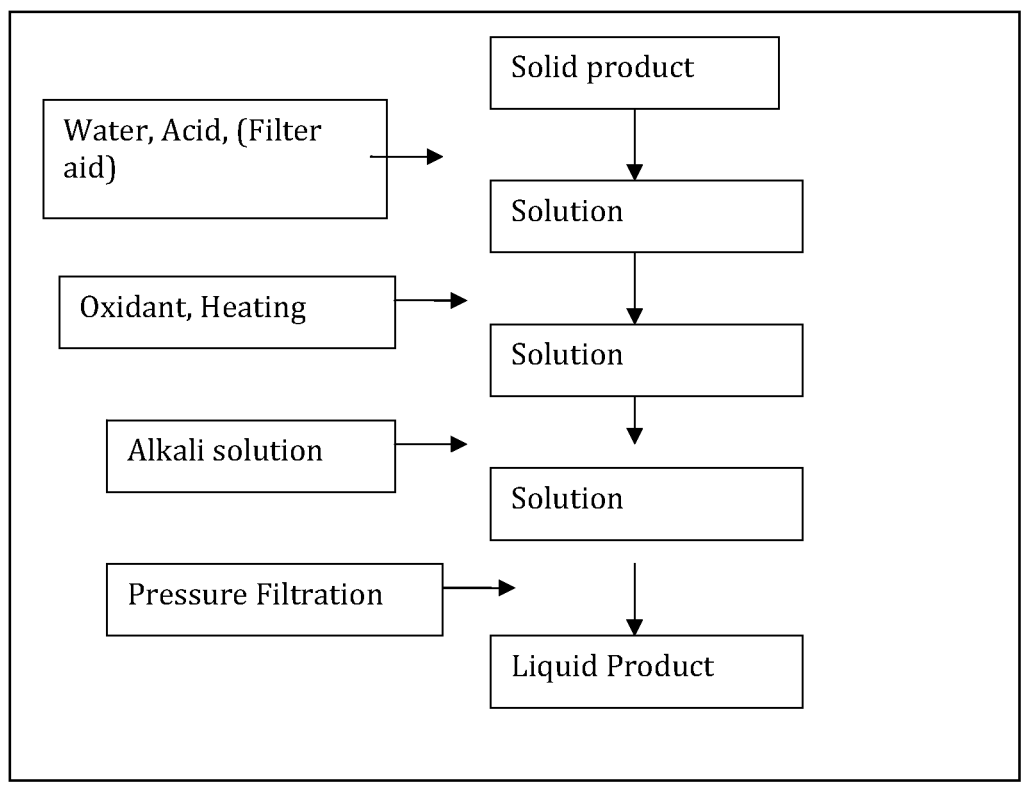
FIG. 1 is a flow chart representing the typical procedures used in the present method.

The present invention provides a method for reducing level of titanium in an aqueous solution of polyester in a safe and effective way, while avoiding hydrolysis of the polyester.

According to the method of the present invention, an aqueous solution of polyester containing residual organic titanium is treated with oxidant under weak acidic condition. The residual organic titanium will become inorganic form through oxidation reaction and precipitate as a titanium-containing solid from the reaction mixture. The titanium-containing solid is then removed from the reaction mixture, preferably by filtration under neutral or weak acidic condition. The weak acidic condition for converting the residual organic titanium into inorganic form thereof is particularly desirable. Particularly, it is found that the oxidation and the subsequent removal of the titanium-containing solid can be effectively conducted when the weak acidic condition is achieved by using phosphoric acid or an acidic salt thereof. It is found that such weak acidic condition not only reduces the hydrolysis risk of polyester, but also increases the titanium conversation rate.

The residual organic titanium in the aqueous solution can be of any source, but in most cases is resulted from a reaction for preparation of polyester using a titanium-based catalyst. As an example, the titanium-based catalyst used in the synthesis for polyester is tetraalkyl titanate (Ti—(O-alkyl)$_4$). In one preferred embodiment of the present invention, the titanium-based catalyst is selected from the group consisting of tetraisopropyl titanate (Ti—(O—Bu)$_4$), tetrabutyl titanate (Ti—(O-iPr)$_4$) and a combination thereof. In one more preferred embodiment of the present invention, the titanium-based catalyst is tetraisopropyl titanate (Ti—(O-iPr)$_4$).

The residual organic titanium left over from the preparation of the polyester can be in the form of the original catalyst as used or any variants resulted from the reaction during the preparation or a mixture of different forms. In one embodiment, the organic titanium can be Ti—(OR$_1$, OR$_2$, OR$_3$, OR$_4$), wherein R$_1$, R$_2$, R$_3$, and R$_4$ are the same or different alkyl groups exchanged during the esterification reaction.

As used therein, the term "polyester" refer to polymers having multiple ester linkages, including polyester produced by reaction of dibasic acids with dihydric alcohols and also derivatives of such polyesters such as copolymers including polyether-polyester copolymers.

According to an embodiment of the present invention, the polyester can be any one derived from titanium-catalyzed reaction. A polyester polymer can be a homopolymer or a copolymer. Typically, polyesters are made by reacting a diol such as ethylene glycol with a dicarboxylic acid as the free acid or its dimethyl ester to produce an ester monomer and/or oligomers, which are then polycondensed to produce the polyester. More than one compound containing carboxylic acid group(s) or derivative(s) thereof and more than one compound containing hydroxyl group(s) or derivatives thereof can be reacted during the process.

Examples of suitable "dicarboxylic acid" component for polyester synthesis include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid".

Examples of suitable "diol" component for polyester synthesis include cycloaliphatic dials preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-diethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

An example of the polyester of the present invention is soil release polyesters, such as a polyether-polyester block copolymer. The polyether-polyester block copolymer is obtained by transesterification reaction of at least one di($C_1$-$C_4$)alkyl ester of aromatic dicarboxylic acid and at least one aliphatic diol or aliphatic polyol followed by polycondensation with one or more compounds selected from the group consisting of at least one polyether, at least one mono-alcohol, at least one mono-carboxylic acid and at least one ester, wherein the polyether has at least one terminal hydroxyl group.

Suitable examples of the di($C_1$-$C_4$)alkyl ester of aromatic dicarboxylic acid for preparation of a polyether-polyester block copolymer include dimethyl esters, diethyl esters, dipropyl esters and dibutyl esters of orthophthalic acid, terephthalic acid, isophthalic acid, 5-sulfoisophthalic acid, 1,2-naphthalene dicarboxylic acid, 1,4-naphthalenedicarboxylic acid, 1,5-naphthalenedicarboxylic acid, 1,6-naphthalenedicarboxylic acid, 1,7-naphthalenedecarboxylic acid, 1,8-naphthalenedicarboxylic acid, 2,3-naphthalenedicarboxylic acid, 2,6-naphthalenedicarboxylic acid and 2,7-naphthalenedicarboxylic acids.

Suitable examples of the aliphatic diol for preparation of a polyether-polyester block copolymer include $C_2$-$C_{12}$ aliphatic dials, and aliphatic polyols such as $C_3$-$C_{12}$ aliphatic triols. More preferably, the aliphatic diol is one or more selected from the group consisting of ethylene glycol, 1,2-propylene glycol, 1,3-propylene glycol, 1,2-butylene glycol, 1,4-butylene glycol, 1,5-pentanedial, 1,6-hexanediol, 1,8-octanediol, 1,2-decanediol, 1,2-dodecanediol and neopentylene glycol.

Suitable examples of the polyether for preparation of a polyether-polyester block copolymer include MPEG of MW 750, PEG of MW 600, PEG of MW 1000, PEG of MW 1500, MPEG-b-PPG of MW 750, PPG-b-PEG-b-PPG of MW 1000 and PPG-b-PEG-b-PPG of MW 1500, wherein MPEG is methoxy polyethylene glycol, PEG is polyethylene glycol, PPG is polypropylene glycol.

PCT/CN2009/072575 describes polyether-polyester copolymers as SRPs obtained by titanium-catalyzed reactions.

In a typical embodiment of the method of the present invention, the present invention provides a method for removing residual organic titanium from an aqueous solution of polyester comprising residual organic titanium, comprising steps:

(a) adjusting pH of the aqueous solution to a value from about 4.0 to about 5.0 by adding phosphoric acid or an acidic salt thereof;

(b) treating the aqueous solution obtained in step (a) with an oxidant that is hydrogen peroxide and peroxyacetic acid to result in a titanium-containing solid; and (c) removing the titanium-containing solid from the reaction mixture obtained in step (b), preferably by filtration.

In one preferred embodiment of the method the present invention, the aqueous solution used in step (a) is obtained by dissolving the polyester comprising residual organic titanium into water, and optionally filtering the solution. The concentration of the polyester in the aqueous solution used in step (a) is not critical for the method of the present invention and can be easily determined based on actual applications. For example, the concentration can be from about 10% to about 90% by weight, preferably from 50% to about 90% by weight, and most preferably about 70% by weight.

In another preferred embodiment of the method of the present invention, a filter aid is introduced into the reaction mixture in step (c). Alternatively, a filer aid can also be introduced in step (a) or step (b).

In step (a) of the method of the present invention, phosphoric acid or an acidic salt thereof is advantageously used to adjust the pH of the aqueous solution. Examples of the acidic salts of phosphoric acid include $NaH_2PO_4$, $KH_2PO_4$, and the like.

Suitable pH after adjusting by an acid as exemplified above in above step (a) is weak acidic, preferably from about 4.0 to about 5.0. Exemplary pH is about 4.0, 4.1, 4.2, 4.3, 4.4, 4.5, 4.6, 4.7, 4.8, 4.9 or 5.0. The most preferred pH is about 4.0.

In the step (b) of the method of the present invention, suitable oxidants used are neutral oxidants or acidic oxidants. The preferred oxidant is hydrogen peroxide or peroxyacetic acid. Most preferably, the oxidant is hydrogen peroxide. Suitable amount of the oxidant used in above step (b) is from about 0.2 to about 5.0%, preferably about 0.3 to about 4.0%, more preferably about 0.4 to about 3.0%, and more preferably about 0.5 to about 2.0%, relative to the weight of the polyester in the aqueous solution used in step (a). Exemplary amount of oxidant is about 0.2, 0.3, 0.4, 0.5, 0.6, 0.7, 0.8, 0.9, 1.0, 1.2, 1.4, 1.6, 1.8, 2.0, 2.5, 3.0, 3.5, 4.0, 4.5 or 5.0% by weight.

According to the present invention, above step (b) is carried out at a suitable temperature that can be determined by one skilled in the art, for example from about room temperature (e.g., 20° C.) to about 90° C., preferably from about 40° C. to about 80° C., more preferably from about 50° C. to about 80° C. Exemplary temperature of the reaction in step (b) is about 30° C., 35° C., 40° C., 45° C., 50° C., 55° C., 60° C., 65° C., 70° C., 75° C., 80° C., 85° C. or 90° C.

According to the present invention, above step (b) can be carried out in a reasonable period of time, for example from about 0.5 hour to about 4 hours, and preferably 1.0 hour to about 3.0 hours. The preferred treating time for above step (b) is about 1.0, 2.0, 3.0 or 4.0 hours.

In step (c) of the method of the present invention, the titanium-containing solid/inorganic titanium is removed from the reaction mixture obtained in step (b). The inorganic titanium resulted from step (b) is TiO2 and can be removed by a conventional means. For example, the inorganic titanium is removed by filtration, preferably with the help of a filter aid. Suitable filter aid can be easily found by simple experimentation. For example, suitable filter aid is selected from the group consisting of BH-20, BH-40, hyflosupercel, and a combination thereof.

In one embodiment, the filtration in step (c) can be performed at from 1.0 atm to 4.0 atm, preferably at from about 2.5 atm to 3.0 atm. Exemplary pressures implemented are about 1.0, 1.5, 2.0, 2.5, 3.0, 3.5 or 4.0 atm. The preferred pressure is about 2.5 or 3.0 atm. Preferably, the filtration in step (c) is carried by at a raised temperature. Suitable temperature for the filtration is from about room temperature (e.g., 20° C.) to about 80° C., preferably from about 60° C. to about 80° C., more preferably from 65° C. to about 75° C. Exemplary temperatures include 40° C., 45° C., 50° C., 55° C., 60° C., 65° C., 70° C., 75° C. and 80° C. The preferred temperature is 65° C., 70° C. or 75° C. In one embodiment, the filtration time in step (c) is from about 1.0 hour to about 2.0 hours.

In one preferred embodiment, the method according to the present invention further comprises the step between step (b) and step (c): adjusting the pH of the aqueous solution obtained in step (b) to a value from about 6.0 to about 7.0 with an alkali, more preferably from about 6.2 to about 6.8 and most preferably of about 6.5. This treatment may prevent the possibility that part of the inorganic titanium might form a complex at lower pH. The formed complex may be undesired for the subsequent filtration in step (c). In one embodiment, the alkali used is in the form of an alkaline solution. In one further embodiment, the alkali is used in the form of an alkaline solution having a pH value from about 8.0 to about 11.0. Suitable alkalis used for adjusting pH back are for example ammonium hydroxide, potassium hydroxide, sodium hydroxide, sodium carbonate, sodium hydrogen carbonate, potassium carbonate, potassium hydrogen carbonate and the like. The preferred alkalis are sodium hydroxide and potassium hydroxide.

The efficiency of the method of the present invention can be monitored by any conventional analytical means, such as Inductively Coupled Plasma Atomic Emission Spectrometer (ICP). The level of titanium in the aqueous solution of polyester can be reduced to less than 5 ppm and preferably less than 1 ppm according to the method of the present invention.

The hydrolysis risk for polyester in the method of the present invention can be monitored by any conventional chromatography such as GPC and HPLC.

The method according to the present invention can find its application in various industries, such as special chemistry, polyester manufacture, waste water treatment, and the like.

EXAMPLES

The following examples are included to illustrate embodiments of the invention. It should be appreciated by those of skill in the art that the techniques disclosed in the examples that follow represent techniques discovered by the inventor to function well in the practice of the invention. However, those of skill in the art should, in light of the present disclosure, appreciate that many changes can be made in the specific embodiments which are disclosed and still obtain a like or similar result without departing from the concept, spirit and scope of the invention. All such similar substitutes and modifications apparent to those skilled in the art are deemed to be within the spirit, scope and concept of the invention as defined by the appended claims.

Preparation Example

Preparation of a SRP

A three-neck flask equipped with magnetic/mechanic stirrer, 40 cm packed fraction column, thermometer and $N_2$ gas inlet pipe, was charged with 29.5 g of dimethyl terephthalate (DMT), 6.10 g of 1,2-propylene glycol (PG), 0.20 g of potassium acetate (KAc), 115 g polyethylene glycol monomethyl ether of molecular weight 750 (MPEG-750), 26.0 g diethylelene glycol diethyl ether (DEG-di-Et) and 0.2 g titanium tetraisopropylate (TPT). The reaction was first carried out at atmospheric pressure at 200° C. for 4 hours under nitrogen purge and methanol was collected via a fractional column. The reaction was then continued under vacuum of about 10 mbar at 210° C. for 6 hours and diethylene glycol diethyl ether was collected. Finally, nitrogen sparge rather than vacuum was used toward the end of the reaction.

Examples 70 g melted SRP obtained in Example 1 was charged into a flask and 30 mL pure water was added and stirred to final concentration of 70% by weight. The titanium residue in the solution was found as about 1,000 ppm. The pH of the solution was adjusted to 4.0-5.0 by adding $H_3PO_4$ or the acidic salts thereof, and an oxidant of hydrogen peroxide or peroxyacetic acid and a filtrate aid were added. The oxidation treatment was conducted under the heating for 1.0-3.0 hours, followed by adjustment of solution pH to 6.0-7.0 with 50% NaOH aqueous solution. Pressure filtration was performed under the pressure from 1.0 atm to 4.0 atm and the temperature from 60° C.-80° C. The efficiency of the filtration was qualified by filtration rate.

The titanium removal efficiency was monitored by 70 P Inductively Coupled Plasma Atomic Emission Spectrometer (ICP) (J Y, French). Parameters used under working condition include 12 L/min of cooling stream flow, 0.25 L/min of carrier gas flow, 600 of reflective powder, 1.4 mL/min of increased volume of solution, and 15 mm above induction loop of observation altitude.

The hydrolysis risk for polyester was monitored by GPC (Waters system) equipped with 600 pump & 410 RI detector and HPLC (Agilent 1100 HPLC system). 0.2 g sample/10mL $H_2O$ was prepared and loaded on GPC and HPLC. GPC (Waters system): columns: Waters Ultrahydrogel Linear and Ultrahydrogel 120 (each 7.8*300 mm); eluent: water; column temperature: 40° C.; and RI detector temperature: 40° C. HPLC (Agilent 1100 HPLC system): column: Shisiedo C18, 150*4.6mm, 3 µm; eluent gradient: see Table 1; flow rate: 1 mL/min; temperature: 40° C.; and detect: 240 nm (ref. 320 nm).

TABLE 1

| Time (min) | $H_2O$ % | ACN % |
|---|---|---|
| 0 | 90 | 10 |
| 16 | 20 | 80 |
| 25 | 20 | 80 |
| 26 | 5 | 95 |
| 40 | 5 | 95 |
| 45 | 90 | 10 |

Different experiment conditions and results are summarized in the following Tables 2-4.

Comparative experiments were performed substantially according to procedures as described above except for different acids for adjusting pH of the solution were used, or the oxidation treatment was performed in alkali condition. The conditions and results of comparative experiments are summarized in the following Tables 2 and 4.

Figure 2:
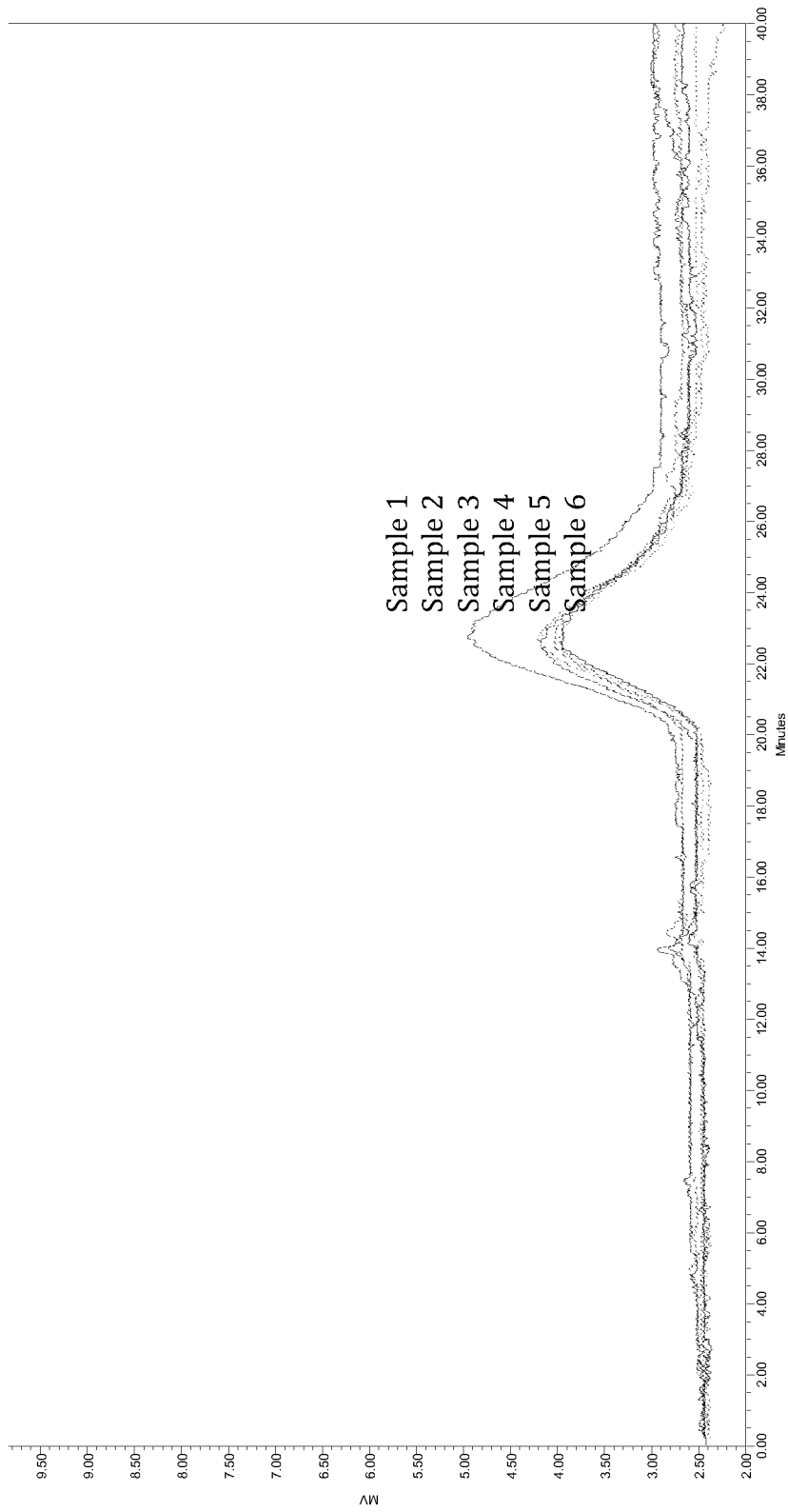
FIG. 2 is a GPC figure monitoring the hydrolysis behavior in aqueous solution of polyester.

As shown in Table 2, when the oxidation was performed at pH 4 or 5, no hydrolysis was observed by both GPC and HPLC, whereas at pH 7 or 8, partial hydrolysis was observed. FIG. 2 shows the results of monitoring the hydrolysis behavior in aqueous solutions of samples 1-6 corresponding to Examples 1-6 as shown in Table 2. In FIG. 2, GPC peak at 22.8 min corresponds to the SRP and remains unchanged, indicating there was no hydrolysis at conditions of Examples 1-6 in Table 2. In addition, data of Examples 1-6 in Table 2 show a good titanium removal efficiency of less than 1 ppm as detected by ICP and a good filtration rate.

TABLE 3

Examples 7-14

| Examples | Temp. of oxidation (° C.) (AcOOH, pH 4.0, $NaH_2PO_4$) | Filter temp. ° C. | Time for oxidation (h) | Finial titanium content in solution detected by ICP (ppm) |
|---|---|---|---|---|
| 7 | 60 | 65 | 1 | <1 |
| 8 | 70 | 65 | 2 | <1 |
| 9 | 70 | 65 | 1 | <1 |
| 10 | 60 | 65 | 4 | <1 |
| 11 | 60 | 65 | 2 | <1 |
| 12 | 70 | 65 | 4 | <1 |
| 13 | 60 | 75 | 2 | <1 |
| 14 | 70 | 75 | 2 | <1 |

Table 3 indicates that oxidation treatment at pH 4 adjusted by $NaH_2PO_4$ and use of AcOOH as oxidant also provided a good titanium removal efficiency of less than 1 ppm as detected by ICP.

TABLE 2

Examples 1-6 and Comparative Examples 1-6

| Ex | Rx Time for oxidation | pH level for oxidation [adjusted by $H_3PO_4$] | Oxidant $(w_t/w_t)$ $H_2O_2$ | Temp. of oxidation | Finial titanium content in the solution detected by ICP (ppm) | Detection by GPC | Detection by HPLC | Filtration Rate (L/m² * min) |
|---|---|---|---|---|---|---|---|---|
| 1 | 1 hr | 4 | 0.40% | 40° C. | <1 | No hydrolysis | No hydrolysis | 15.29 |
| 2 | 1 hr | 5 | 0.70% | 50° C. | <1 | No hydrolysis | No hydrolysis | 12.94 |
| 3 | 2 hr | 4 | 0.70% | 60° C. | <1 | No hydrolysis | No hydrolysis | 16.04 |
| 4 | 2 hr | 5 | 1.00% | 40° C. | <1 | No hydrolysis | No hydrolysis | 12.64 |
| 5 | 3 hr | 4 | 1.00% | 50° C. | <1 | No hydrolysis | No hydrolysis | 15.62 |
| 6 | 3 hr | 5 | 0.40% | 60° C. | <1 | No hydrolysis | No hydrolysis | 13.78 |
| C1 | 1 hr | 7 | 1.00% | 60° C. | / | Partially hydrolyzed | Partially hydrolyzed | / |
| C2 | 1 hr | 8 | 1.00% | 60° C. | / | Partially hydrolyzed | Partially hydrolyzed | / |
| C3 | 2 hr | 7 | 1.00% | 60° C. | / | Partially hydrolyzed | Partially hydrolyzed | / |
| C4 | 2 hr | 8 | 1.00% | 60° C. | / | Partially hydrolyzed | Partially hydrolyzed | / |
| C5 | 3 hr | 7 | 1.00% | 60° C. | / | Partially hydrolyzed | Partially hydrolyzed | / |
| C6 | 3 hr | 8 | 1.00% | 60° C. | / | Partially hydrolyzed | Partially hydrolyzed | / |

TABLE 4

Examples 15-17 and Comparative Examples 7-9

| Examples | Filtration Aid | Acid Kind (to pH 4.0) | Finial titanium content in solution detected by ICP (ppm) |
|---|---|---|---|
| 15 | BH-20 | $H_3PO_4$ | <1 |
| 15 | BH-20 | $NaH_2PO_4$ | <1 |
| 17 | BH-40 | $H_3PO_4$ | <1 |
| 18 | BH-40 | $KH_2PO_4$ | <1 |
| 19 | Hyflosupercel | $H_3PO_4$ | <1 |
| C7 | BH-20 | HCl | Cannot be filtered. |
| C8 | BH-40 | AcOH | Cannot be filtered. |
| C9 | Hyflosupercel | $H_2SO_4$ | Cannot be filtered. |

Table 4 shows the efficiency of removing residue titanium by using different filtration aids and using different acids in oxidation treatment by $H_2O_2$. It can be seen from Table 4 that different aids such as BH-20, BH-40 and hyflosupercel can be used to facilitate a satisfactory efficiency of removing residue titanium. Concerning acid used to adjust pH for oxidation treatment, $H_3PO_4$, $NaH_2PO_4$ and $KH_2PO_4$ all provide a good efficiency of removing residue S titanium, whereas samples obtained by using HCl, AcOH and $H_2SO_4$ cannot be filtered in the subsequent filtration procedure.

What is claimed is:

1. A method for removing residual organic titanium from an aqueous solution of a polyester comprising residual organic titanium, comprising steps of:
   (a) adjusting pH of the aqueous solution to a value from about 4.0 to about 5.0 by adding phosphoric acid or an acidic salt thereof;
   (b) treating the aqueous solution obtained in said step (a) with an oxidant that is hydrogen peroxide or peroxyacetic acid to result in a titanium-containing solid; and
   (c) removing the solid from the reaction mixture obtained in said step (b).

2. The method according to claim 1, further comprising a step between step (b) and step (c): adjusting the pH of the reaction mixture obtained in step (b) to a value from about 6.0 to about 7.0 with an alkali, wherein said alkali used is in the form of an alkaline solution.

3. The method according to claim 2, wherein said alkali used in the form of an alkaline solution having a pH value from about 8.0 to about 11.0.

4. The method according to claim 1, wherein the pH of the aqueous solution is adjusted to a value of about 4.0 in said step (a).

5. The method according to claim 1, wherein the oxidant is used in an amount of from about 0.2% to about 5.0% by weight, relative to the weight of the polyester in the aqueous solution used in said step (a).

6. The method according to claim 1, wherein said step (b) is carried out at a temperature from room temperature to about 80° C.

7. The method according to claim 1, wherein the treating time of said step (b) is from about 0.5 hour to about 4.0 hours.

8. The method according to claim 1, wherein the step (c) is carried out by filtration.

9. The method according to claim 1, wherein a filter aid is introduced into the aqueous solution in one or more steps of (a)-(c).

10. The method according to claim 9, wherein the filter aid is selected from the group consisting of BH-20, BH-40, hyflosupercel, and a combination thereof.

11. The method according to claim 9, wherein the filtration in step (c) is carried out at a temperature from about 40° C. to about 90° C.

12. The method according to claim 8, wherein the filtration in step (c) is carried out under a pressure from about 1.0 atm to about 4.0 atm.

13. The method according to claim 8, wherein the filtration time in step (c) is from about 1.0 hour to about 2.0 hours.

14. The method according to claim 1, wherein the polyester comprising residual organic titanium is obtained from the preparation of polyester in the presence of a titanium-based catalyst.

15. The method according to claim 1, wherein the aqueous solution used in step (a) is obtained by dissolving the polyester comprising residual organic titanium into water, and optionally filtering the solution.

16. The method according to claim 14, wherein the titanium-based catalyst is an organic titanate.

17. The method according to claim 16, wherein the organic titanate is tetraalkyl titanate selected from the group consisting of tetraisopropyl titanate, tetrabutyl titanate and a combination thereof.

18. The method according to claim 1, wherein the polyester is a soil-release polyester or a polyether-polyester block copolymer.

19. The method according to claim 1, wherein the concentration of the polyester in the aqueous solution used in said step (a) is from about 10% to about 90% by weight.

* * * * *